United States Patent
Eslambolchi

[11] Patent Number: 5,859,836
[45] Date of Patent: Jan. 12, 1999

[54] ALTERNATE RING RESTORATION TECHNIQUE

[75] Inventor: Hossein Eslambolchi, Basking Ridge, N.J.

[73] Assignee: AT&T Corp, Middletown, N.J.

[21] Appl. No.: 681,747

[22] Filed: Jul. 29, 1996

[51] Int. Cl.[6] .................................................. H04J 3/14
[52] U.S. Cl. ........................................ 370/222; 370/404
[58] Field of Search .................................. 370/222, 223, 370/224, 403, 404, 405, 406, 407, 228, 389, 400, 449, 258; 395/182.02, 182.07

[56] References Cited

U.S. PATENT DOCUMENTS

| | | | |
|---|---|---|---|
| 4,956,835 | 9/1990 | Grover | 370/228 |
| 5,007,052 | 4/1991 | Flammer | 370/389 |
| 5,056,085 | 10/1991 | Vu | 370/400 |
| 5,065,399 | 11/1991 | Hasegawa et al. | 395/182.02 |
| 5,146,452 | 9/1992 | Pekarske | 370/228 |
| 5,182,744 | 1/1993 | Askew et al. | 370/16 |
| 5,233,604 | 8/1993 | Ahmadi et al. | 370/238 |
| 5,435,003 | 7/1995 | Chng et al. | 395/182.02 |
| 5,440,540 | 8/1995 | Kremer | 370/223 |
| 5,457,689 | 10/1995 | Marvit et al. | 370/449 |
| 5,463,615 | 10/1995 | Steinhorn | 370/221 |
| 5,481,604 | 1/1996 | Minot | 379/221 |
| 5,495,471 | 2/1996 | Chow et al. | 370/221 |
| 5,590,118 | 12/1996 | Nederlof | 370/218 |
| 5,646,936 | 7/1997 | Shah et al. | 370/228 |

*Primary Examiner*—Chau Nguyen
*Assistant Examiner*—Kenneth Vanderpuye
*Attorney, Agent, or Firm*—Robert B. Levy

[57] ABSTRACT

Traffic in a multiple ring transmission system (10) is advantageously routed via alternate rings (12a, 12c and 12d) should a ring (12b) fail. Upon the failure of a ring, a hunt is first undertaken to establish the available restoration capacities within the rings. Next, a selected set of available restoration capacities is reserved (selected) to optimize the transmission of traffic between a destination node (14a) and an origin node (14f). The selected set of restoration capacities are then cross-connected to route traffic between the origin and destination nodes.

7 Claims, 5 Drawing Sheets

FIG. 4

RESTORATION CAPACITY RESERVATION

| NODE | FROM | SPARE CAPACITY (OC-48s) | DISTANCE (MILES) | COUNT | RING |
|---|---|---|---|---|---|
| 14c | 14f | 5 | 25 MILES | 1 | 12a |
| 14e | 14f | 5 | 25 MILES | 1 | 12b |
| 14d | 14c | 5 | 25 MILES | 2 | 12a |
| 14d | 14e | 5 | 25 MILES | 2 | 12a |
| 14a | 14d | 5 | 175 MILES | 3 | 12a |
| 14a | 14b | 5 | 25 MILES | 3 | 12a |
| 14b | 14c | 5 | 25 MILES | 2 | 12a |
| 14j | 14b | 5 | 10 MILES | 3 | 12d |
| 14l | 14j | 5 | 150 MILES | 4 | 12d |
| 14k | 14l | 5 | 50 MILES | 5 | 12d |
| 14k | 14j | 5 | 50 MILES | 4 | 12d |
| 14h | 14k | 5 | 50 MILES | 5 | 12c |
| 14i | 14h | 5 | 150 MILES | 6 | 12c |
| 14i | 14h | 5 | 100 MILES | 6 | 12c |
| 14g | 14i | 5 | 125 MILES | 7 | 12b |

5,859,836

ALTERNATE RING RESTORATION TECHNIQUE

TECHNICAL FIELD

This invention relates to a technique for restoring telecommunications traffic in a multiple ring transmission system when a ring has failed.

BACKGROUND ART

A typical Synchronous Optical Network (SONET) ring transmission system for carrying telecommunications traffic includes a plurality of nodes at which telecommunications traffic may originate and terminate. In practice, each node takes the form of a fiber-optic hub and associated cross-connect system for coupling to a telephone switch that sends traffic to, and receives traffic from, the node. Every node is linked to each of a pair of neighboring nodes in daisy-chain fashion by at least one optical fiber link to yield ring-like structure across which telecommunications traffic may pass. When the nodes are separated from each other by large distances, it is not desirable from a cost standpoint to connect all of the nodes in a single ring. Rather, the nodes that are relatively closely spaced are connected in individual rings having at least one node connected to a node in another ring. Alternatively, two or more rings may effectively share nodes to permit traffic to pass from one ring to another.

If a single fiber optic link in a ring should fail, the traffic that would otherwise pass over the failed link can usually be re-routed about the remainder of the ring between an origin and node (where traffic originates) and a destination node (at which traffic terminates). Should two links fail in the same ring of a multi-ring system, it has been necessary in the past to physically repair at least one of the failed links in order to restore traffic on the ring. Such physical repairs are often time consuming. While such repairs are being made, traffic remains disrupted.

Thus, there is a need for a technique for restoring traffic in a multiple ring system via alternate rings when two or more links in one ring have failed.

BRIEF SUMMARY OF THE INVENTION

Briefly, in accordance with a preferred embodiment, a technique is provided for restoring traffic in a transmission system of interconnected rings. Should one or more links fail within a ring, a hunt is first undertaken to establish what restoration capacity exists on the rings within the transmission system (in terms of possible alternative paths between an origin and destination nodes). In practice, the restoration capacity hunt is accomplished by a processor at a node associated with a failed link. Upon detecting a failed link, the processor queries at least one of its neighboring nodes by flooding a packet to that node to cause it to ascertain its characteristics, and to determine whether it possess any spare capacity on its associated links. Each neighboring node then queries at least one of its neighboring nodes by flooding a packet thereto to cause each successive node to ascertain its characteristics and whether its possess spare capacity on its associated links. Eventually, the nodes are successively queried in this manner to establish the existing restoration capacity in each of the rings within the transmission system.

After the restoration capacity is determined, a selected set of restoration capacities (i.e., links) is reserved. The selected set of restoration capacities is reserved by choosing among the restoration capacities at the various nodes, a collective set of capacities (i.e., a set of possible links) that optimize the transmission of traffic between the origin and destination nodes. For example, if two or more possible restoration capacities exist between the origin and destination nodes, the restoration capacity that yields the lowest distance and traverses the fewest number of nodes is selected. Thereafter, a transmission path is routed along the selected capacities, typically by cross connecting the corresponding links in the reserved set of restoration capacity.

BRIEF DESCRIPTION OF THE DRAWINGS

FIG. 4 depicts a table illustrating the exemplary restoration capacities in the transmission system of FIG. 1.

DETAILED DESCRIPTION

Figure 1:
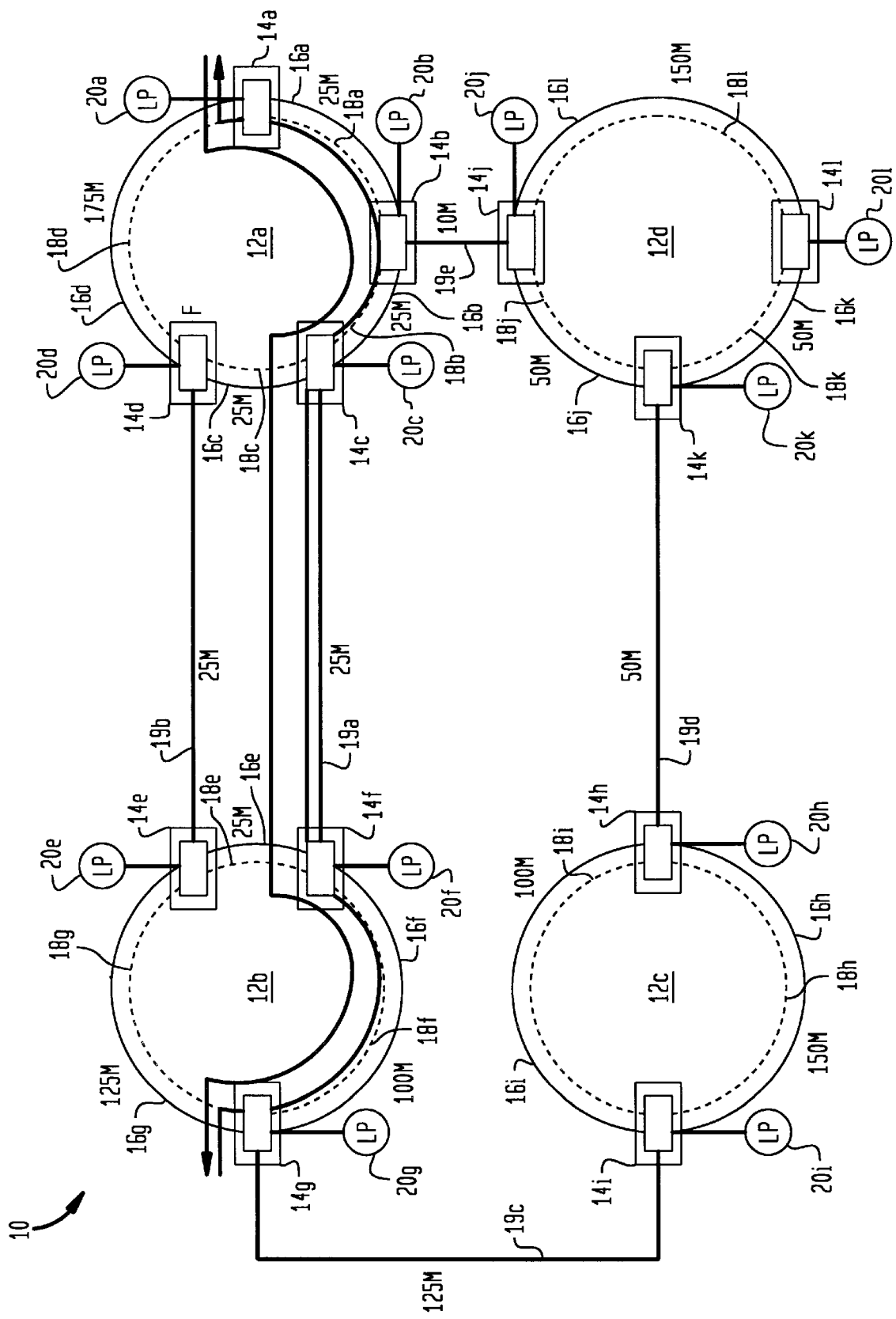
FIG. 1 is a block schematic diagram of a multi-ring transmission system in accordance with prior art.

FIG. 1 illustrates a conventional SONET ring transmission system 10 comprised of four individual rings 12a–12d although a greater or lesser number of rings may be present. Each of the rings 12a–12d comprises two or more nodes at which telecommunications traffic may originate and terminate. In the illustrated embodiment, the ring 12a includes four nodes 14a–14d, whereas the ring 12b includes three nodes 14e–14g. The ring 12c comprises two nodes 14h–14i, whereas the ring 12d comprises three nodes 14j–14l. Typically, each of the nodes 14a–14l comprises a well known fiber optic hub (not shown) and associated cross-connect system for coupling to a telephone switch (not show) of a type that is well known.

Each pair of nodes in each ring is linked by one of main optical fiber links 16a–16l, each main fiber link including at least a pair of optical fibers (not shown) for carrying traffic in opposite directions. In the illustrated embodiment, the node pairs 14a–14b, 14b–14c, 14c–14d, 14d–14a, 14e–14f, 14f–14g, 14g–14e, 14h–14i, 14i–14h, 14j–14k, 14k–14l and 14l–14k are coupled by main links 16a–16l, respectively. Additionally, the node pairs 14a–14b, 14b–14c, 14c–14d, 14d–14a, 14e–14f, 14f–14g, 14g–14e, 14h–14i, 14i–14h, 14j–14k, 14k–14l and 14l–14k are also coupled by optical fiber links 18a–18l, respectively (shown in dashed lines). The optical fiber links 18a–18l are designated as "protection" links because each is held in reserve and is usually employed only in the event that a corresponding one of the main links 16a–16l becomes inoperative.

To allow traffic originating within one of the rings 12a–12d to pass to another ring, at least one node within each ring is connected to another node in another ring. In the illustrated embodiment, the node pairs 14d–14e, 14c–14f, 14g–14i, 14h–14k, 14j–14b, are each linked by one of optical fiber links 19a–19e, respectively.

Associated with each of the nodes node 14a–14l is one of line processors (LP) 20a–20l that monitors the traffic at the associated node. Each of the LPs 20a–20l has capability to detect the absence of traffic at the node should one of the corresponding links coupled to node fail.

Figure 2:
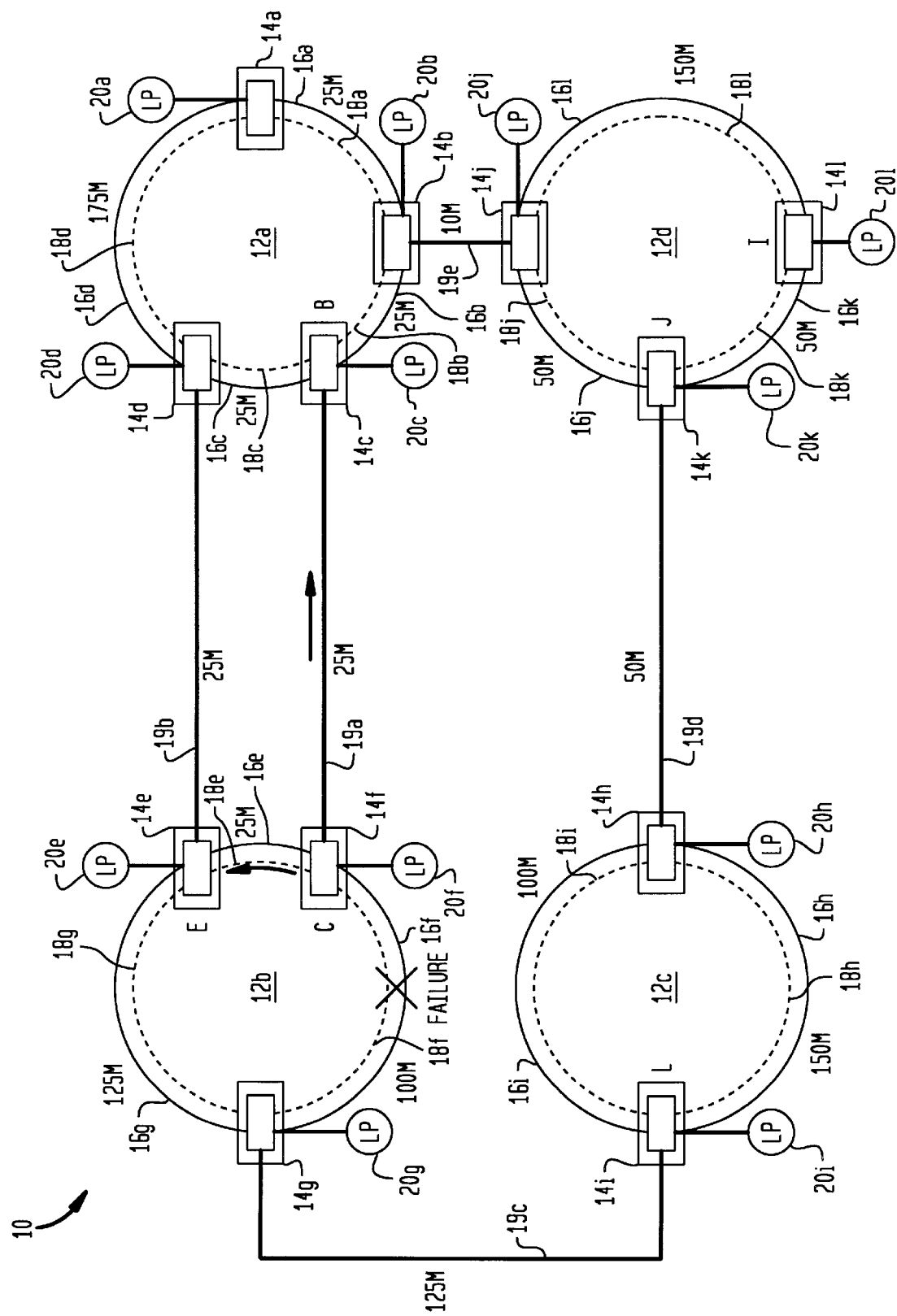
FIG. 2 depicts the transmission system of FIG. 1 upon a failure of a link in one of the rings.

While the transmission system 10 is designed for very high reliability, failures can and do occur. Often such failures are due to external causes. For example, a main optical fiber link, such as link 16f in ring 12b, as well its associated protection link 18f, may become severed as a result of inadvertent excavation. Such a failure is depicted in FIG. 2 by virtue of the "X" superimposed on these links. Should both these links fail, then no traffic can pass between the nodes 14f and 14g across either of the links 16f and 18f.

Ordinarily, when both the main and protection links 16f and 18f fail, the traffic that would otherwise be carried by these links between the nodes 14f and 14g would be re-routed across the main optical fiber links 16e and 16g (or the protection links 18e and 18g). However, one of the main links 16e and 16g, as well as an associated one of protection links 18e and 18g, respectively) may also be in operative. For instance, one of the links 16e and 16g (and an associated one of the protection links 18e and 18g, respectively) may be unavailable because of scheduled maintenance. Thus, it may not be possible to route the traffic within the ring 12b on the links 16e and 16g or their associated protection links 18e and 18g, respectively.

In the past, the failure of two links in a given ring traffic required physical restoration of at least one link to restore traffic. Physical restoration of a severed link is a timely process. A repair crew must be dispatched to the site of the link and the appropriate repairs must be made.

In accordance with the invention, a technique is provided for automatically restoring traffic on alternate rings within the system 10 under the circumstances when two or more links in a single ring have failed. The traffic restoration technique of the invention involves the following three phases:

1) Hunting for available restoration capacity on the rings 12a–12d;
2) Reserving the restoration capacity within the rings that optimizes traffic transmission between a selected pair of nodes; and
3) Cross-connecting the links associated with the reserved restoration capacity to route a transmission path between the selected nodes.

Each of these phases will be described in detail below.

Phase 1—Restoration Capacity Hunt

The hunt for available restoration capacity within the transmission system 10 is initiated by the line processor at a node associated with a failed link. In the illustrated embodiment, upon the failure of the links 16f and 18f in ring 12b in FIG. 2 at time $T_0$, the processor 20f commences the restoration capacity hunt. (It should be understood that the hunt could be commenced by the processor 20g.) Upon detecting a transmission failure, the processor 20g generates a flooding packet 22 (see FIG. 3) at time $T_1$ for the purpose of causing at least one of its neighboring nodes (14e and 14f) to establish their characteristics and to determine their available restoration capacity.

Figure 3:
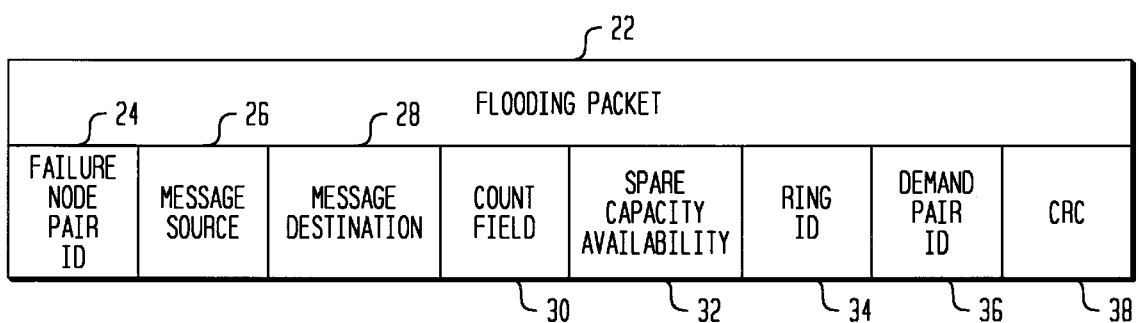
FIG. 3 depicts a packet sent by a processor within the transmission system of FIG. 1 for causing each neighboring node to ascertain its characteristic and its available restoration capacity upon the failure of a link.

Referring to FIG. 3, each flooding packet 22 comprises a plurality of fields that individually store information associated with the capacity hunt. Field 24 stores information that identifies the failure node pair, i.e., the two nodes whose connecting links have failed. Thus, when links 16f and 18f in ring 12b of FIG. 2 have failed, the information within the field 24 in the flooding packet 22 of FIG. 3 identifies nodes 14f and 14g as the failure node pair. Field 26 that stores information about the identity of the node (e.g., node 14f) whose associated processor (processor 20f) generated the flooding packet 22. Field 28 stores information that identifies the node (e.g., node 14e) destined to receive the flooding packet 22.

Field 30 contains a count indicative of successive number of nodes that have been flooded with a flooding packet. As will be discussed below, upon receipt of a flooding packet 22, each receiving node, in turn, floods at least one of its neighbors with a packet. For example, the flooding packet that generated by the node 14f has a field count of 1. However, the field count for the packet flooded by the node 14e to the node 14d has a field count of 2.

Field 32 within the flooding packet 22 stores information indicative of the spare capacity availability associated with that node sending the packet. For example, the flooding packet 22 sent by the node 14f in ring 12b would indicate that no spare capacity exists on either of the links 16f and 18f because those links have failed. However, the links 16e (or 18e) may contain some spare capacity, and if so, information indicative of such that capacity is specified in the field 32. Field 34 stores information indicative of the identity of the ring whose node has generated the flooding packet 22. Thus, if the node generating the flooding packet 22 resided within the ring 12b, the field 34 would so indicate.

Field 36 within the flooding packet 22 contains information indicative of the transmission capacity required for restoration purposes. For example, in the illustrated embodiment, five separate trunks, each of OC-48 capacity, may be needed between a particular pair of nodes. If such is the case, then the field 36 will so indicate. Lastly, field 38 contains a cyclic redundancy check code for error checking purposes to allow a recipient node to verify that it has correctly received the flooding packet.

Referring to FIG. 2, at time $T_2$, the LP 20f associated with node 14f floods the nodes 14e and 14c with packets. In turn, each of the nodes 14e and 14c floods each of its neighboring nodes 14g and 14d, and 14b and 14d, respectively, with a packet 22 at time $T_3$. At time $T_4$, the node 14d floods its neighboring node 14a with a packet while the node 14b floods its neighboring nodes 14a and 14j with a packet. At time $T_5$, the node 14j floods its neighboring nodes 14k and 14l with packets. At time $T_6$, the node 14l floods the node 14k with a packet, whereas the node 14k now floods the nodes 14h. At time $T_7$, the node 14h floods the node 14i with separate packets across the links 16i and 16h, respectively. Lastly, at time $T_8$, the node 14i floods the node 14g with a packet to cause that node to ascertain its characteristics and available capacity.

By successively flooding the nodes within the transmission system 10 of FIG. 1 with packets in the manner described, information can be obtained regarding where potential restoration capacity exists within the system. For the illustrated embodiment of FIG. 1, exemplary restoration capacities are listed below in Table 1.

TABLE 1

| Time | From | To | Spare Capacity (OC-48s) | Distance | Count | Ring |
|---|---|---|---|---|---|---|
| $T_2$ | 14f | 14e | 5 | 25 miles | 1 | 12b |
| $T_2$ | 14f | 14c | 5 | 25 miles | 1 | 12a |
| $T_3$ | 14e | 14g | 5 | 125 miles | 2 | 12b |
| $T_3$ | 14c | 14d | 5 | 25 miles | 2 | 12a |
| $T_3$ | 14c | 14b | 5 | 25 miles | 2 | 12a |
| $T_4$ | 14d | 14a | 5 | 175 miles | 3 | 12a |
| $T_4$ | 14b | 14a | 5 | 25 miles | 3 | 12a |
| $T_4$ | 14b | 14j | 5 | 10 miles | 3 | 12d |
| $T_5$ | 14j | 14k | 5 | 50 miles | 4 | 12d |
| $T_5$ | 14j | 14l | 5 | 150 miles | 4 | 12d |
| $T_6$ | 14l | 14k | 5 | 50 miles | 5 | 12d |
| $T_6$ | 14k | 14h | 5 | 50 miles | 5 | 12c |

TABLE 1-continued

| Time | From | To | Spare Capacity (OC-48s) | Distance | Count | Ring |
|---|---|---|---|---|---|---|
| T_7 | 14h | 14i | 5 | 100 miles | 5 | 12c |
| T_7 | 14h | 14i | 5 | 150 miles | 5 | 12c |
| T_8 | 14i | 14g | 5 | 125 miles | 5 | 12b |

It should be noted that no capacity exits between nodes 14g and 14f because of the failure of both links 16f and 18f. Further, no capacity exits between nodes 14e and 14g across either of the links 16g and 18g. For example, the both of the links 16g and 18g may be out of service. Alternatively, these links may be in service but may lack any additional restoration capacity.

Phase 2—Restoration Capacity Reservation

Having established the available restoration capacities during the phase 1, a set of capacities (i.e., links) is reserved during phase 2 to provide a restoration path between a pair of nodes, say nodes 14a and 14g, that optimizes the transmission of traffic between them. Transmission optimization is accomplished by minimizing the overall length of the selected restoration capacities. Thus, as between two possible links across which restoration traffic may be routed, the shorter of the two links is preferred. Additionally, to optimize the transmission of traffic, the number of nodes crossed should be minimized in order to minimize any latency delay.

Given the constraints of minimizing the length of the links, and minimizing the number of nodes crossed, for the available restoration capacities depicted in FIG. 4, a restoration path can readily be reserved along the links 16a/18a, 19e, 16j/18j, 19d, 16i/18i and 19c. The restoration path reserved along the links 16a/18a, 19e, 16j/18j, 19d, 16i/18i and 19c has the shortest overall length and crosses the least number of nodes.

While other possible restoration paths exist, none has the shortest overall length and the least number of nodes crossed. For example, a restoration path could be reserved via the links 16a/18a, 19e, 16l/18l, 16k/18k, 19d, 16i/18i and 19c. However, by comparison to the restoration path reserved along the links 16a/18a, 19e, 16j/18j, 19d, 16i/18i and 19c, a path reserved along the links 16a/18a, 19e, 16l/18l, 16k/18k, 19d, 16i/18i and 19c would have a greater overall length and would cross more nodes.

There are several possible approaches that may be employed to reserve the optimal restoration path. If the number of nodes and links are not too numerous, it may be desirable to establish all possible restoration paths and then compare them to determine which one possess the shortest overall length and lowest number of node crossings. If the number of nodes and links are large, an iterative approach may be more desirable. Initially, a restoration path comprised of the shortest possible individual links is tentatively selected. If that path has less node crossings than a path comprised of a successively selected set of links, then the former path would be reserved. Otherwise, the process continues with another iteration.

Phase 3—Cross Connection

Figure 5:
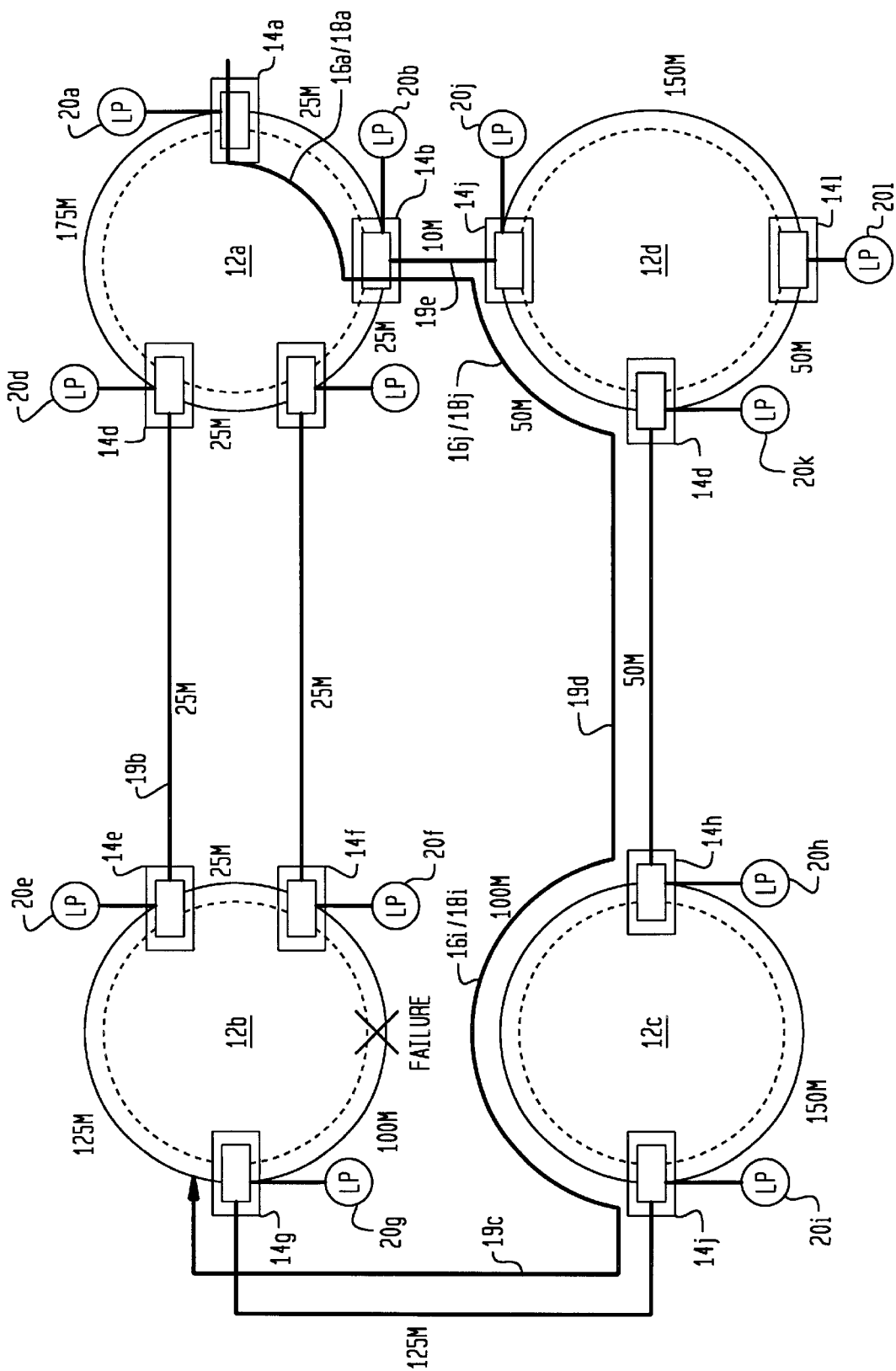
FIG. 5 depicts a restoration path within the transmission system of FIG. 1 that is selected in accordance with the available restoration listed in FIG. 4.

Once the restoration capacity is reserved during phase 2, then a restoration path is routed along the reserved capacity. Referring now to FIG. 5, in the illustrated embodiment, the restoration path is routed along the segments 16a/18a, 19e, 16j/18j, 19d, 16i/18i and 19c by cross-connecting the nodes 14b, 14j, 14k, 14h, and 14j. Actual cross connection of these nodes can be readily accomplished automatically by the appropriate receipt of control signals at the line processor at each node since each typically possesses automatic cross-connection capability. Alternatively, such cross-connections could be accomplished manually in the event that one or more nodes lack an ability to automatically cross-connect links.

The foregoing describes a technique for accomplishing restoration of traffic in a multiple ring system 10 via alternate rings should two or more links in a given ring fail. As may be appreciated, the traffic restoration technique of the invention has the capability to achieve rapid restoration, particularly by the use of the line processors 20a–20l for automatically establishing the available restoration capacity in a time manner. Once the restoration capacity has been established, an optimal restoration path can be reserved, and thereafter realized by cross-connecting appropriate nodes far more quickly than the usual time needed to physically restore one or more failed links.

What is claimed is:

1. In connection with a transmission system for carrying telecommunications traffic, said system comprised of multiple, interconnected rings, each comprised of at least two nodes, each node linked to each of a pair of neighboring node by, at least one main link, a method for restoring traffic upon the failure of at least one link in a ring, comprising the steps of:

(a) hunting among the rings for available restoration capacities for carrying restoration traffic;

(b) reserving, among the available restoration capacities, a selected set of restoration capacities that optimizes restoration traffic, the set selected among the available restoration capacities to minimize overall length and node crossings; and (c) cross-connecting said selected set of restoration capacities to establish a route for carrying restoration traffic.

2. The method according to claim 1 wherein the step of hunting for available restoration capacity comprises the steps of:

(a) flooding a first packet of information from a first node associated with a fail link to at least one neighboring node to cause said neighboring node to ascertain its available restoration capacity;

(b) flooding a subsequent packet of information from said neighboring node to at least one of its neighboring node to cause it ascertain its available restoration capacity; and (c) repeating step (b) until the nodes are successively flooded with packets to establish the available restoration capacities within the system.

3. The method according to claim 1 wherein the restoration capacities in said selected set are cross-connected automatically.

4. The method according to claim 1 wherein the restoration capacities in said selected set are cross-connected manually.

5. In connection with a transmission system for carrying telecommunications traffic, said system comprised of multiple, interconnected rings, each comprised of at least two nodes, each node linked to each of a pair of neighboring node by at least one main link, a method for restoring traffic upon the failure of at least one link in a ring, comprising the steps of:

(a) flooding a first packet of information from a first node associated with a failed link to at least one neighboring node to cause it to ascertain its available restoration capacity;

(b) flooding a successive packet of information from said neighboring node to its neighboring node to cause it to ascertain its available restoration capacity;

(c) repeating step (b) until the nodes have been flooded with packets and the available restoration capacities determined;

(d) reserving among the established restoration capacities, a selected set of reservation capacities whose overall length and node crossings are minimized; and (e) cross-connecting said selected set of restoration capacities to yield an optimal path for carrying restoration traffic.

6. The method according to claim 5 wherein the restoration capacities in said selected set are cross-connected automatically.

7. The method according to claim 5 wherein the restoration capacities in said selected set are cross-connected manually.

* * * * *